US009342083B2

(12) United States Patent
Suzuki

(10) Patent No.: US 9,342,083 B2
(45) Date of Patent: May 17, 2016

(54) DRIVING DEVICE, FLASHER DEVICE, AND PROJECTOR

(71) Applicant: Casio Computer Co., Ltd., Tokyo (JP)

(72) Inventor: Hideo Suzuki, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 302 days.

(21) Appl. No.: 13/760,346

(22) Filed: Feb. 6, 2013

(65) Prior Publication Data

US 2013/0215399 A1 Aug. 22, 2013

(30) Foreign Application Priority Data

Feb. 17, 2012 (JP) .................................. 2012-032864

(51) Int. Cl.
*G05F 1/46* (2006.01)
*H05B 37/02* (2006.01)
(Continued)

(52) U.S. Cl.
CPC ................ *G05F 1/46* (2013.01); *G03B 21/206* (2013.01); *H04N 9/3158* (2013.01); *H04N 9/3161* (2013.01); *H05B 33/0815* (2013.01); *H05B 33/0824* (2013.01); *H05B 37/02* (2013.01); *G03B 21/204* (2013.01); *G03B 21/2013* (2013.01); *G03B 33/08* (2013.01); *Y02B 20/347* (2013.01)

(58) Field of Classification Search
CPC .......................................................... G05F 1/46
USPC ........................ 315/200 R, 209 R, 307, 200 A
See application file for complete search history.

(56) References Cited

U.S. PATENT DOCUMENTS 6,198,258 B1* 3/2001 Ando et al. .................... 323/222
2010/0045195 A1* 2/2010 Yamamuro et al. ........... 315/219
(Continued)

FOREIGN PATENT DOCUMENTS

JP 2007195373 A 8/2007
JP 2010049523 A 3/2010
(Continued)

OTHER PUBLICATIONS

Japanese Office Action (and English translation thereof) dated Jul. 14, 2015, issued in counterpart Japanese Application No. 2012-032864.

*Primary Examiner* — Douglas W Owens
*Assistant Examiner* — Pedro C Fernandez
(74) *Attorney, Agent, or Firm* — Holtz, Holtz & Volek PC

(57) ABSTRACT

A driving device includes a switching regulator and a timing controller. The switching regulator includes a switching element, a smoothing circuit including an inductor connected to the switching element, and a controller that turns on/off the switching element. The switching regulator converts input voltage to output voltage as output of the smoothing circuit by turning on/off the switching element. The timing controller controls the controller to operate and stop operating. The controller performs constant current control by feeding back inductor current, generating a PWM signal based on the fed-back current and a target value, and outputting the PWM signal to the switching element so that the inductor current approximates to the target value. When performing the constant current control, the controller sets the target value to a value different from a reference target value for a steady period.

5 Claims, 5 Drawing Sheets

(51) Int. Cl.
  *G03B 21/20* (2006.01)
  *H05B 33/08* (2006.01)
  *H04N 9/31* (2006.01)
  *G03B 33/08* (2006.01)

(56) References Cited

U.S. PATENT DOCUMENTS

2010/0207547 A1* 8/2010 Kuroki et al. ............... 315/307
2012/0081094 A1* 4/2012 Luo et al. ...................... 323/284
2012/0081096 A1* 4/2012 Fujii et al. ..................... 323/285
2012/0187858 A1* 7/2012 Omi et al. ...................... 315/224
2012/0206427 A1* 8/2012 Yamamuro et al. ........... 345/207

FOREIGN PATENT DOCUMENTS

JP        2010-110190 A     5/2010
WO   WO/2011/052418   *   5/2011   ............ H01S 5/0683

* cited by examiner

DRIVING DEVICE, FLASHER DEVICE, AND PROJECTOR

BACKGROUND OF THE INVENTION

1. Field of the Invention

The present invention relates to a driving device, a flasher device and a projector.

2. Description of Related Art

A switching regulator is a circuit to convert direct-current input voltage into direct-current output voltage by turning a switching element on and off. Such a switching regulator is used for an electrical power supply or a driver for various loads (see Japanese Patent Application Laid-Open No. 2010-110190, for example). The controller of the switching regulator performs PWM (pulse width modulation) control over a switching element by outputting a PWM signal to the switching element. The controller feeds back inductor current of the switching regulator and monitors the fed-back current to generate a PWM signal having a duty cycle based on the fed-back current. In this way, constant current control is performed where the inductor current is maintained constant. Examples of such current mode control include average current mode control (see Japanese Patent Application Laid-Open No. 2010-110190, for example). The average current mode control is a control system to maintain the average value of inductor current constant by monitoring the average current value of inductor current including a ripple and by generating a PWM signal having a duty cycle based on the average current value.

Right after the controller of the switching regulator starts to operate, the output voltage of the switching regulator goes into a steady state later than inductor current when the average value of the inductor current moves from a transient state to a steady state due to the effect of a smoothing circuit of the switching regulator or the like. This also causes the output current of the switching regulator to go into the steady state later than the inductor current. When the controller repeatedly operates and stops operating so as to enable and disable a load repeatedly, the output current of the switching regulator goes into the steady state late every time the controller comes into operation. This prevents the increase in speed of enabling/disabling of the load.

SUMMARY OF THE INVENTION

Therefore, an object of the present invention is to control the output current of a switching regulator to go into a steady state as quickly as possible.

In order to solve the problems described above, an aspect of the present invention provides a driving device including a switching regulator that includes: a switching element, a smoothing circuit including an inductor connected to the switching element, and a controller that turns the switching element on and off, wherein the switching regulator converts input voltage to output voltage as output of the smoothing circuit by turning the switching element on and off; and a timing controller that controls the controller to operate and stop operating, wherein the controller performs constant current control in which the controller feeds back current of the inductor, generates a PWM signal based on the fed-back current and a target value, and outputs the PWM signal to the switching element so that the current of the inductor approximates to the target value; and wherein, when performing the constant current control, the controller sets the target value to a value different from a reference target value for a steady period.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
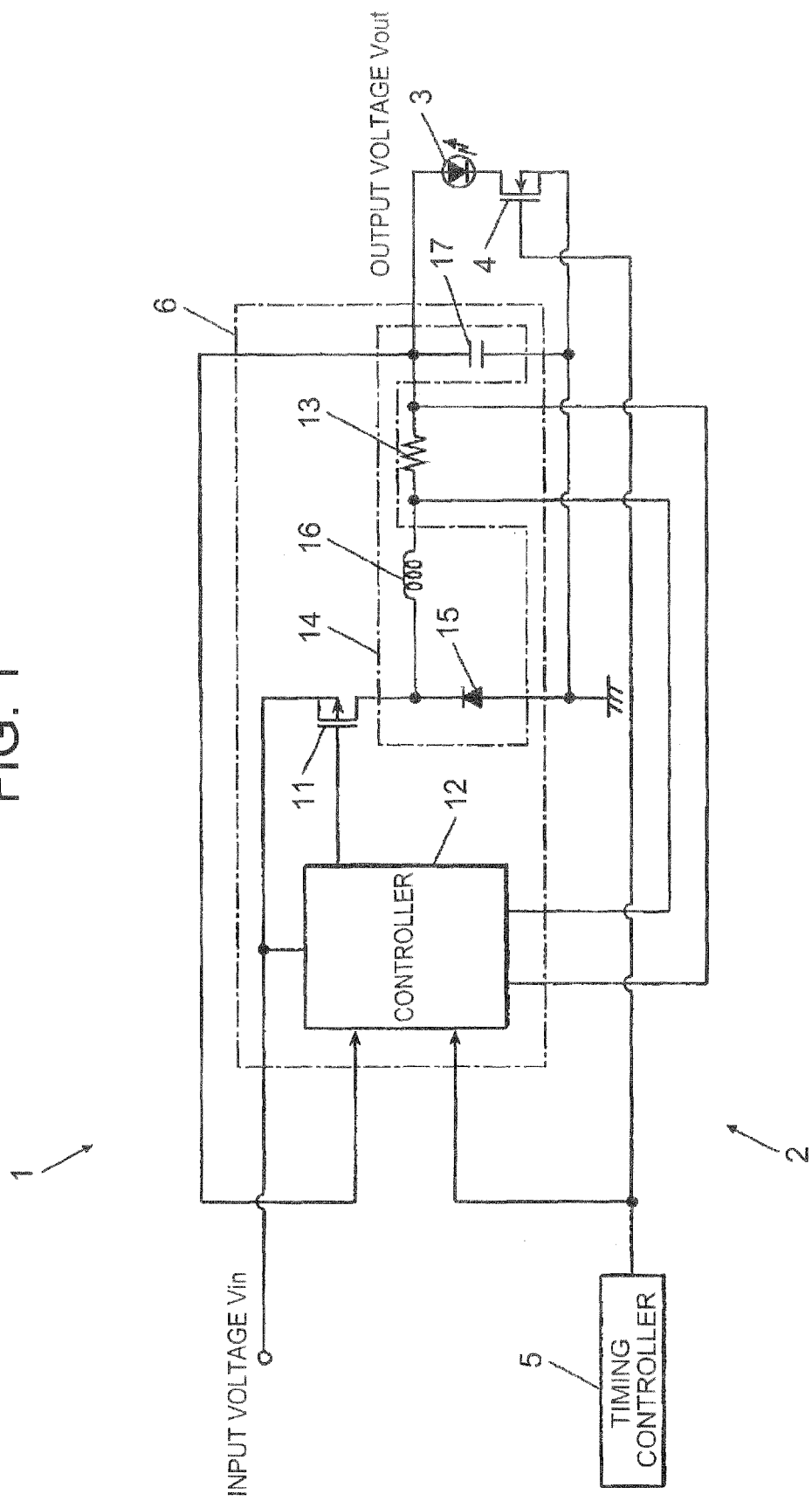
FIG. 1 is a circuit diagram of a flasher device of a first embodiment.

Embodiments of the present invention are described below with reference to the attached drawings. The embodiments described below include various limitations which are technically preferable to carry out the present invention. The technical scope of the present invention, however, is not limited to the embodiments and the examples shown in the drawings.

First Embodiment

Figure 2:
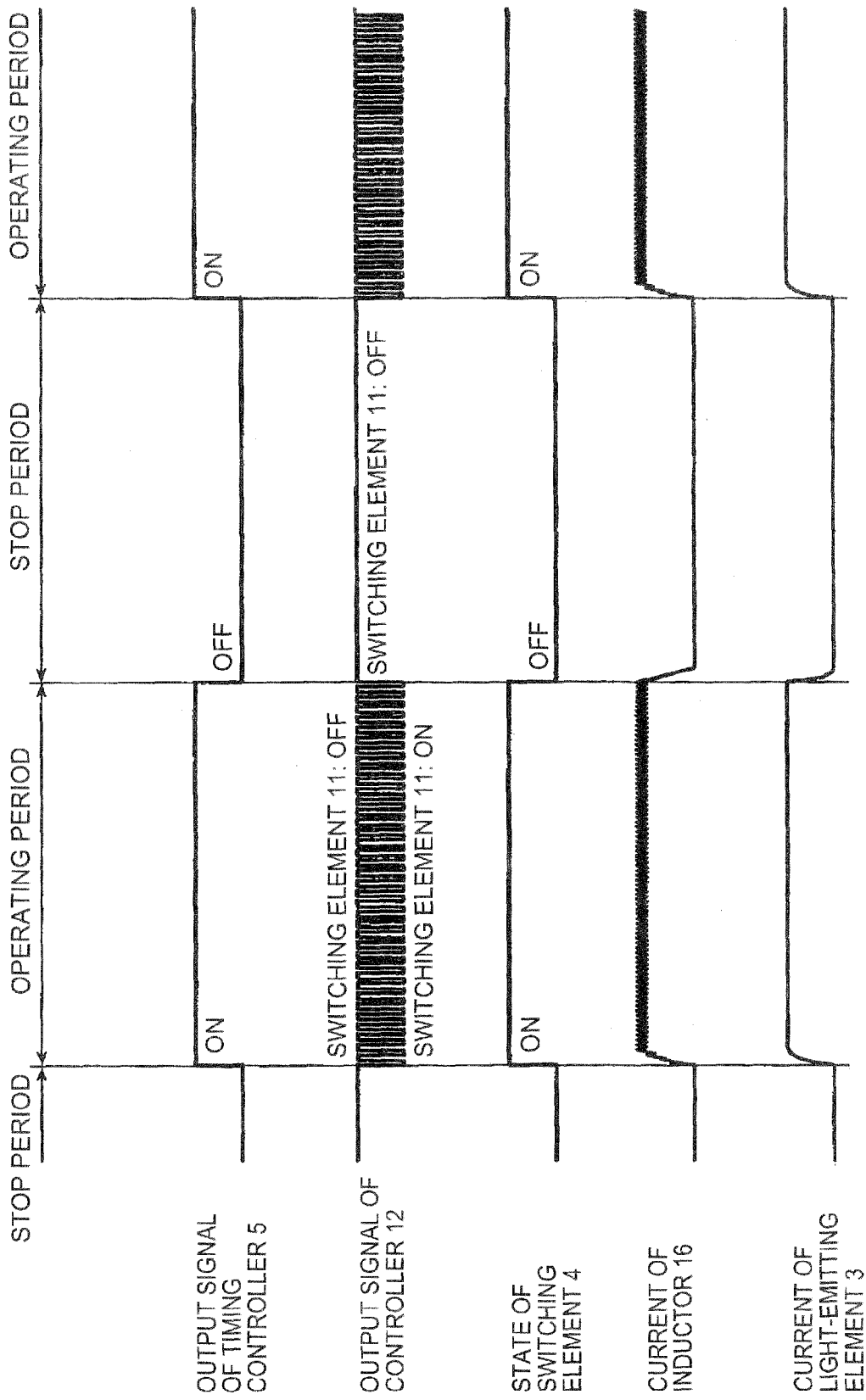
FIG. 2 is a timing chart showing the signal waveform of each element of the flasher device.

FIG. 1 is a circuit diagram of a flasher device 1. FIG. 2 is a timing chart.

The flasher device 1 includes a light-emitting element 3 as a load, a semiconductor switching element 4 to open or close the circuit of the light-emitting element 3, a switching regulator (DC-DC converter) 6 to convert direct-current input voltage Vin to direct-current output voltage Vout (Vout<Vin), and a timing controller 5 to turn the semiconductor switching element 4 on and off and to enable and disable the switching regulator 6. The circuit composed of the semiconductor switching element 4, the timing controller 5 and the switching regulator 6 is a driving device 2. The driving device 2 applied to the flasher device 1 drives the light-emitting element 3, which causes the light-emitting element 3 to periodically flash (to be tuned on and off). The light-emitting element 3 has a short flashing cycle, and the light-emitting element 3 flashes so rapidly that the flashing cannot be recognized by the naked eye. While the light-emitting element 3 is taken as a load here, a load except the light-emitting element 3 may be turned on and off by the driving device 2.

The light-emitting element 3 is a light-emitting diode, an organic EL element, a semiconductor laser, or another semiconductor light-emitting element.

An N-channel field-effect transistor is used as the semiconductor switching element 4. The drain of the semiconductor switching element 4 is connected to the cathode of the light-emitting element 3, and the source thereof is grounded. The gate of the semiconductor switching element 4 is connected to the timing controller 5. The semiconductor switching element 4 is turned on and off based on the output signal (hereinafter referred to as an on-time signal) from the timing controller 5.

In other words, the timing controller 5 outputs the on-time signal, which has a constant cycle as shown in FIG. 2, to the gate of the semiconductor switching element 4, and thereby turns the semiconductor switching element 4 on and off. The timing controller 5 controls the on-time (pulse width) of the on-time signal, and thereby the ratio of the duration of on-state (duty cycle) of the semiconductor switching element 4 is controlled (which will be described in detail later).

The switching regulator 6 converts input voltage Vin to output voltage Vout by turning a switching element 11 on and off. The switching regulator 6 includes the switching element 11, a controller 12, a resistor 13 and a smoothing circuit 14. The smoothing circuit 14 includes a free wheel diode 15, an inductor 16 and a capacitor 17.

A P-channel field-effect transistor is used as the switching element 11. The source of the switching element 11 is connected to the electrical power supply of the input voltage Vin, and the drain thereof is connected to the cathode of the free wheel diode 15 and the inductor 16.

The inductor 16 and the resistor 13 are connected in series between the cathode of the free wheel diode 15 and the anode of the light-emitting element 3. The inductor 16 is connected to the cathode of the free wheel diode 15. The resistor 13 is connected to the anode of the light-emitting element 3. The anode of the free wheel diode 15 is grounded. One terminal of the capacitor 17 is connected to the inductor 16 via the resistor 13, and connected to the anode of the light-emitting element 3. The other terminal of the capacitor 17 is grounded.

The gate of the switching element 11 is connected to the controller 12, and the switching element 11 is turned on and off based on the output signal (PWM signal) from the controller 12.

The on-time signal output by the timing controller 5 is input to the controller 12. In response to the on-time signal, the controller 12 switches the PWM signal on and off to turn the switching element 11 on and off. Operation of the controller 12 and an on-state of the semiconductor switching element 4 are in synchronization with each other, and stopping of the controller 12 and an off-state of the semiconductor switching element 4 are in synchronization with each other.

During the period when the on-time signal output by the timing controller 5 is in an on-state, i.e., during the period when the controller 12 is operating, the controller 12 outputs the PWM signal, which has a constant cycle as shown in FIG. 2, to the gate of the switching element 11, and thereby turns the switching element 11 on and off. In other words, the PWM signal for the switching element 11 is output by the controller 12 only during the period when the on-time signal output by the timing controller 5 is in an on-state. The PWM signal output by the controller 12 is enabled by the on-time signal. Therefore, the switching element 11 is turned on and off with a shorter cycle than the semiconductor switching element 4. During the period when the on-time signal output by the timing controller 5 is off (in an off-state), i.e., during the period when the controller 12 is not operating, the controller 12 does not output the PWM signal to the switching element 11 and therefore the switching element 11 is kept in an off-state.

When the switching element 11 is in an on-state, energy is stored in the inductor 16 due to the current flowing from the input (the electrical power supply of the input voltage Vin) to the output (the anode of the light-emitting element 3) through the switching element 11, the inductor 16 and the resistor 13. Then, when the switching element 11 is turned off, the inductor 16 generates induced electromotive force which causes current to flow through the free wheel diode 15, and the energy stored in the inductor 16 is released due to generation of current flowing from the ground to the output (the anode of the light-emitting element 3) through the free wheel diode 15, the inductor 16 and the resistor 13. This converts the input voltage Vin to the output voltage Vout. A ripple occurs in the output voltage Vout even during a steady period (a period except the initial transient period) in the operating period of the controller 12. The ripple becomes lower due to charging and discharging of the capacitor 17 while the elements are turned on and off, leading to smoothing the output voltage Vout.

The resistor 13 detects current of the inductor 16. The inductor current also flows through the resistor 13, and the magnitude of the inductor current appears as a voltage difference between both ends of the resistor 13. As shown in FIG. 2, a ripple occurs in the inductor current due to switching on and off of the switching element 11. That is, the inductor current increases when the switching element 11 is in an on-state (i.e., when the PWM signal output by the controller 12 is at a low level), whereas the inductor current decreases when the switching element 11 is in an off-state (i.e., when the PWM signal output by the controller 12 is at a high level).

The magnitude of current flowing through the inductor 16 is converted to a voltage difference produced between both ends of the resistor 13. The voltage difference is fed back to the controller 12 as current information, and the controller 12 performs feedback control during an operating period in response to the magnitude of the fed-back voltage difference. Specifically, the controller 12 calculates the average current value from the fed-back current for the period when the inductor current increases (i.e., the period when the switching element 11 is in an on-state) or for the period when the inductor current decreases (i.e., the period when the switching element 11 is in an off-state), or for both of these periods. The controller 12 generates the PWM signal having a duty cycle based on the calculated average current value and a target value, and outputs the PWM signal to the gate of the switching element 11 (average current mode control). In this way, the controller 12 approximates the inductor current value to the target value and performs constant current control so as to maintain the inductor current value at the target value. Thus, as shown in FIG. 2, when the controller 12 comes into operation, the inductor current remains constant after increasing if a ripple component is disregarded. Accordingly, constant current flows through the light-emitting element 3 as well, which allows the light-emitting element 3 to emit light at constant intensity. On the other hand, when the controller 12 stops operating, the inductor current decreases, and then, is reduced to zero. Thus, no current flows through the light-emitting element 3, which causes the light-emitting element 3 to stop emitting light. In this way, the light-emitting element 3 flashes.

Figure 3:
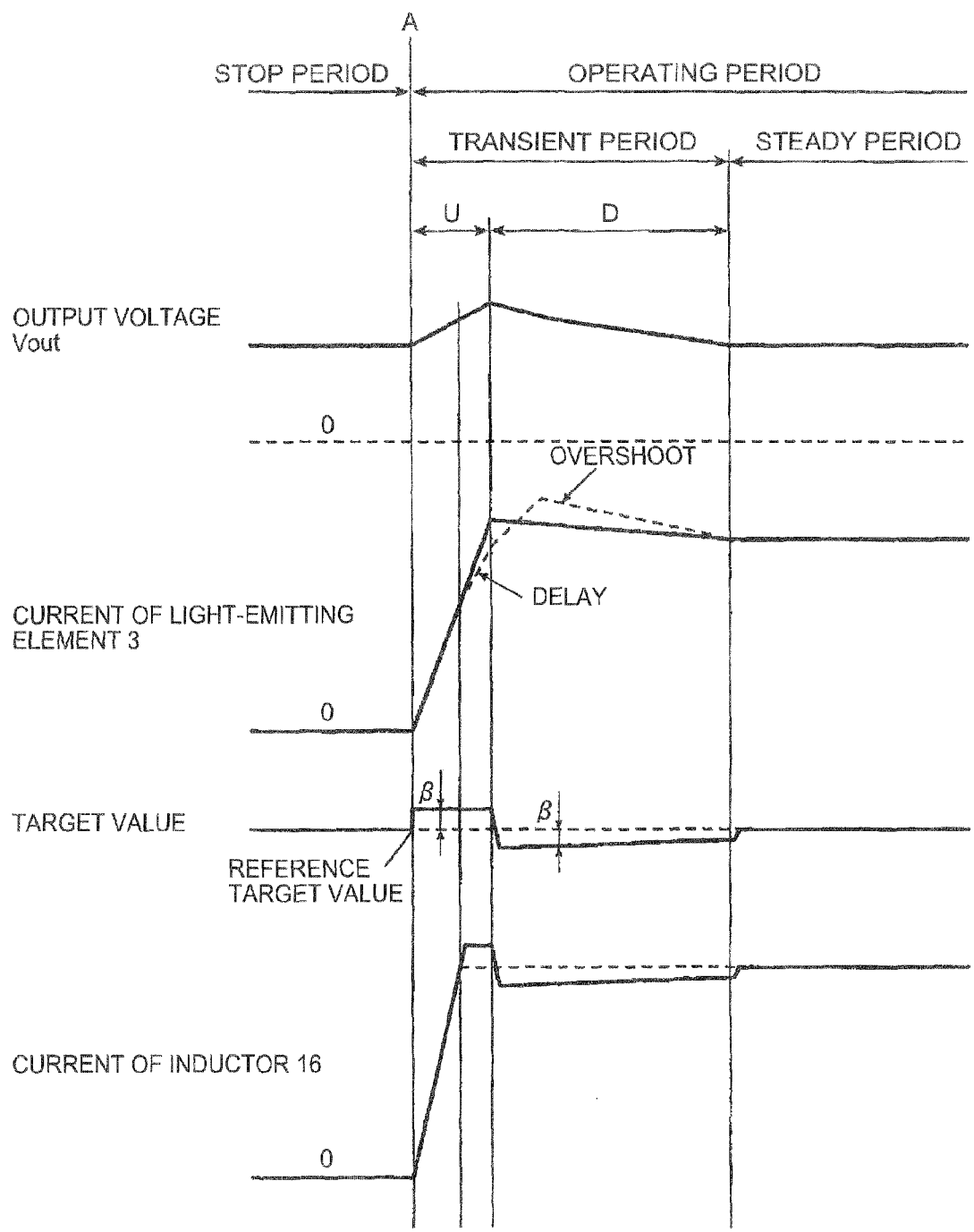
FIG. 3 is a timing chart showing the signal waveform of each element of the flasher device in a transient period.

FIG. 3 shows the waveform of the output voltage Vout in an initial transient period in the operating period of the controller 12. In FIG. 3, the ripple component of the output voltage Vout is eliminated. As shown in FIG. 3, when the semiconductor switching element 4 and the switching element 11 are turned on (i.e., the point A), the output voltage Vout increases with time and the waveform of the output voltage Vout continuously increases. Therefore, the capacitor 17 is charged (see period U). In the period U, the inductor current is divided into the current for charging the capacitor 17 and the current for the light-emitting element 3 (i.e., the output current of the switching regulator 6). Then, the output voltage Vout decreases with time. Therefore, the capacitor 17 is discharged (see period D) since the waveform of the output voltage Vout continuously declines. In the period D, the inductor current and the discharge current of the capacitor 17 are added up and flow through the light-emitting element 3. In the following steady period, the output voltage Vout remains almost constant if a ripple component is disregarded. The current i of the capacitor 17 at the time of charging or discharging of the capacitor 17 is expressed by the following formula (1):

$$i = C*(dv/dt) \quad (1)$$

wherein dv/dt is the time rate of change (slope of voltage waveform) of the voltage of the capacitor 17, and C is the capacity of the capacitor 17.

The charge-discharge behavior of the capacitor 17 in the transient period causes the current of the light-emitting element 3 to increase and decrease due to addition and subtraction of the currents, causing the current of the light-emitting element 3 to be unstable (see the dotted line in FIG. 3). In view of this, the controller 12 performs average current mode control where the controller 12 corrects the target value for constant current control in response to increase or decrease of the output voltage in the transient period. This makes the current of the light-emitting element 3 stable. Detailed explanations are given below.

The output voltage Vout is fed back to the controller 12, and the controller 12 monitors the output voltage Vout in the operating period. Alternatively, a ripple in the output voltage Vout may be eliminated by a filter such as a low-pass filter, and the output voltage Vout, from which a ripple component has been eliminated, may be fed back to the controller 12.

The controller 12 detects the time rate of change (the slope of waveform) of the output voltage Vout by monitoring the output voltage Vout. The time rate of change is a positive value when the slope of waveform of the output voltage Vout continuously increases, whereas the time rate of change is a negative value when the slope of waveform of the output voltage Vout continuously declines.

The controller 12 calculates a correction value from the detected time rate of change. Specifically, the controller 12 calculates the correction value with the following formula (2):

$$\beta = k*a*C \quad (2)$$

wherein β is the correction value to be calculated, and α is the detected time rate of change.

As shown in formula (2), the correction value is a linear function of the time rate of change, and C is a constant, i.e., the capacity of the capacitor 17. Further, k is a positive constant and is obtained based on leakage current and other effects of circuit elements. Since C is a positive value, the correction value β is a positive value when the slope of waveform of the output voltage Vout continuously increases, whereas the correction value β is a negative value when the slope of waveform of the output voltage Vout continuously decreases. The higher the absolute value of the time rate of change a of the output voltage Vout is, the higher the absolute value of the correction value β is.

Instead of using formula (2), the controller 12 may store in advance a correction table (look-up table) showing the correspondence relationship between a time rate of change and a correction value. In this case, the controller 12 refers to the correction table to identify the correction value β corresponding to the detected time rate of change α from the correction table. In the correction table stored in advance by the controller 12, the time rates of change and the corresponding correction values, respectively, satisfy formula (2). Therefore, as a time rate of change becomes higher, the corresponding correction value also becomes higher in the correction table. More specifically, when the time rate of change is zero, the corresponding correction value is zero; when the time rate of change is a positive value, the corresponding correction value is a positive value; and when the time rate of change is a negative value, the corresponding correction value is a negative value.

Controlling with such a correction table eliminates the need for calculations using formula (2), and only requires reference to the correction table. So, this increases the processing speed and can flexibly correspond to the circuit construction.

The controller 12 corrects a target value by adding a calculated correction value β to an original target value, and performs average current mode control (feedback control) based on the corrected target value. Specifically, the controller 12 calculates the average current value from the fed-back current for the period when the inductor current increases or for the period when the inductor current decreases or for both of these periods. The controller 12 generates the PWM signal having a duty cycle based on the calculated average current value and the corrected target value. The controller 12 then outputs the PWM signal to the gate of the switching element 11. Thus, the controller 12 performs constant current control where the controller 12 controls the inductor current to approximate to the corrected target value and maintains the inductor current at the corrected target value. The target value before the correction value β is added thereto is referred to as a reference target value (see FIG. 3).

As shown in FIG. 3, the slope of waveform of the output voltage Vout continuously increases in the period U. Therefore, the correction value β is a positive value, and the target value is corrected to a value obtained by adding the absolute value of the correction value β to the reference target value. Therefore, the inductor current of the period U is larger than that of the steady period, which improves the speed at which the current of the light-emitting element 3 increases. That is, even when the inductor current is divided into the current for charging the capacitor 17 and the current for the light-emitting element 3, the current of the light-emitting element 3 quickly approximates to the current (which corresponds to the target value before correction) of the light-emitting element 3 for the steady period. In FIG. 3, a ripple component in the inductor current is eliminated.

The slope of waveform of the output voltage Vout continuously declines in the period D. Therefore, the correction value β is a negative value, and the target value is corrected to a value obtained by subtracting the absolute value of the correction value β from the reference target value. Therefore, the inductor current of the period D is smaller than that of the steady period. Accordingly, even when the current generated due to discharge of the capacitor 17 is added to the inductor current and the sum current is supplied to the light-emitting element 3, the current of the light-emitting element 3 approximates to the current (which corresponds to the target value before correction) of the light-emitting element 3 for the steady period.

In the steady period, the output voltage Vout remains constant if a ripple component is disregarded. Therefore, the correction value β is zero, which means the target value is the reference target value.

In the case where the target value is not corrected, there is a delay in a response of the current value of the light-emitting element 3 to the increase in inductor current value due to charging of the capacitor 17 (see "delay" in FIG. 3); and then the current of the light-emitting element 3 becomes larger than the inductor current (see "overshoot" in FIG. 3) due to discharging of the capacitor 17, as indicated by the dotted line in FIG. 3. On the other hand, in the case where the target value is corrected, the current of the light-emitting element 3 approximates to the inductor current (which corresponds to the target value before correction) as indicated by the solid line in FIG. 3. This allows the current of the light-emitting element 3 (output current of the switching regulator 6) to go into a steady state quickly. This increases the speed of actuating (operating) and stopping the controller 12 and flashing of the light-emitting element 3, and minimizes the deviation from a target current, such as an overshoot.

The switching regulator 6 is prepared by adding a feedback system (feedback circuit) for monitoring the output voltage Vout to a feedback system for monitoring the current of the inductor 16. The switching regulator 6 can perform phase compensation easily with a simple circuit and can operate at a high-speed compared with a switching regulator where a feedback system for directly monitoring the current of the light-emitting element 3 is added. Moreover, the switching regulator 6 does not need additional power components, such as a resistor, to detect the current of the light-emitting element 3, and can perform control for the transient period when the current of the light-emitting element 3 rises without lowering the efficiency, leading to rapid start-up of the light-emitting element 3.

In the foregoing descriptions, the correction value is obtained from the formula (2) or the correction table. Alternatively, the correction value may be a positive steady value when the calculated time rate of change $\alpha$ is a positive value, the correction value may be a negative steady value when the calculated time rate of change $\alpha$ is a negative value, and the correction value may be zero when the calculated time rate of change $\alpha$ is zero.

Modification of First Embodiment

Figure 4:
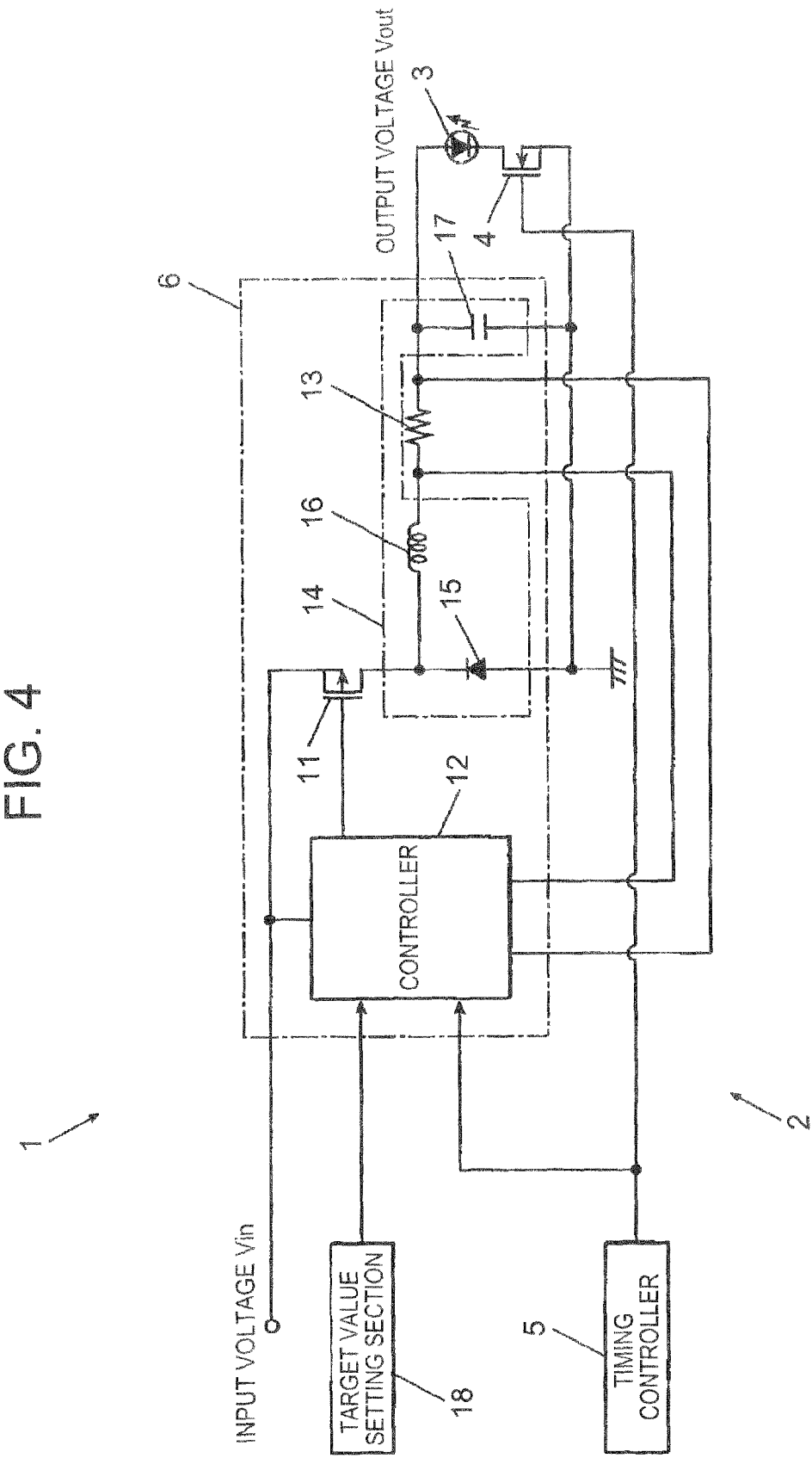
FIG. 4 is a circuit diagram of a flasher device in a modification of the first embodiment.

In the first embodiment, the target value for the constant current control is corrected more accurately based on the time rate of change the fed-back output voltage. Alternatively, a feedback system (feedback circuit) for monitoring the output voltage Vout may be omitted as shown in FIG. 4 to simplify the structure, since the time rate of change of the output voltage for the initial period of the operating period is predictable to some extent if the configuration of the drive circuit is fixed. In FIG. 4, a target value setting section 18 generates signal having the waveform representing the target value as shown in FIG. 3, and outputs the target value signal to the controller 12. The controller 12 generates a PWM signal having a duty cycle based on an input target value and a fed-back current value (average current value, for example), and outputs the PWM signal to the gate of the switching element 11. In this way, the controller 12 approximates the inductor current to the target value and performs constant current control so as to maintain the inductor current at the target value.

In this case, the target value set by the target value setting section 18 is programmed in advance. The time of a transient period and the amount of correction to be made may be obtained in advance based on experiments or the like, and the obtained values may be read to perform control.

In the first embodiment, the target value for the initial period of the operating period of the controller is set to a value different from the target value for the steady period (the reference target value). Such a circuit configuration is insusceptible to the effect of a transient change of the output voltage when a disturbance occurs, which advantageously brings the output current of the switching regulator into a steady state quickly.

In the first embodiment, the semiconductor switching element 4 and the semiconductor switching element 11 are an N-channel field-effect transistor and a P-channel field-effect transistor, respectively. Alternatively, the P channel and the N channel may be interchanged. In this case, the logic of a gate signal may appropriately be inverted.

While the switching regulator 6 in the first embodiment is a buck switching regulator, the switching regulator 6 may be a boost or buck-boost switching regulator instead. That is, the circuit configuration of the switching element 11 and the smoothing circuit 14 may be changed into a boost or buck-boost type.

In the case where a boost type is employed, for example, additional control, such as control of ratio between the inductor current and the output current, may be performed in accordance with the configuration change.

While the switching regulator 6 in the first embodiment is a non-isolated switching regulator, the switching regulator 6 may be an isolated switching regulator instead.

The controller 12 performs the constant current control (feedback control) through average current mode control in the first embodiment. Alternatively, the constant current control (feedback control) may be performed through peak current mode control.

Second Embodiment

Figure 5:
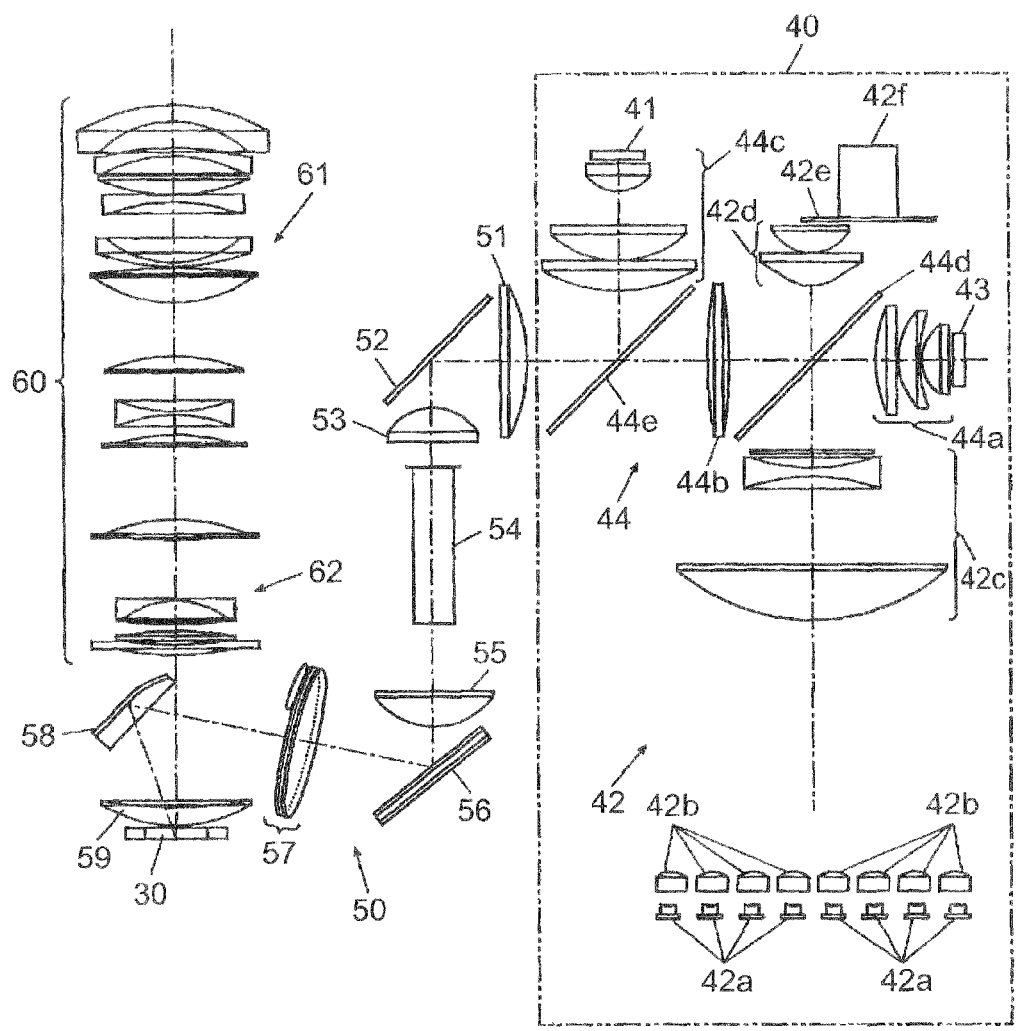
FIG. 5 is a plan view of the optical unit of a projector.

With reference to FIG. 5, explanations about a projector including a flasher device 1 are given below. FIG. 5 is a plan view of the optical unit of the projector.

As shown in FIG. 5, the projector includes a display element 30, a time-division light generator 40, a light-source optical system 50 and a projection optical system 60.

The time-division light generator 40 emits red light, green light and blue light on a time division basis. The time-division light generator 40 includes a first light source 41, a light source unit 42, a second light source 43 and an optical system 44.

The light source unit 42 generates green light. Specifically, the light source unit 42 emits excitation light and converts the excitation light into green light. The light source unit 42 includes a plurality of excitation light sources 42a, a plurality of collimator lenses 42b, a lens group 42c, a lens group 42d, a fluorescent wheel 42e and a spindle motor 42f.

The excitation light sources 42a are two-dimensionally arrayed. Each of the excitation light sources 42a is a laser diode to emit an excitation laser beam. The wavelength band of the excitation laser beam emitted from each excitation light source 42a is the blue light band or the ultraviolet band, but is not limited thereto. The time-division light generator 40 includes a driving device 2 (see FIG. 1 or FIG. 4) for excitation light sources 42a. That is, the light-emitting element 3 shown in FIG. 1 or FIG. 4 corresponds to the excitation light sources 42a, which are allowed to flash by the driving device 2.

The collimator lenses 42b are arranged opposite to the respective excitation light sources 42a, and the excitation laser beam emitted from each excitation light source 42a is collimated by the corresponding collimator lens 42b. The lens group 42c and the lens group 42d are disposed on the same optical axis. The lens group 42c and the lens group 42d bring a group of laser excitation beams collimated by the collimator lenses 42b together and condense the beams.

The fluorescent wheel 42e is disposed opposite to the face where the excitation light sources 42a are two-dimensionally arrayed. The lens group 42c and the lens group 42d are disposed between the fluorescent wheel 42e and the excitation light sources 42a. The optical axis of the lens group 42c and the lens group 42d lies at right angles to the fluorescent wheel

42e. The excitation laser beam condensed by the lens group 42c and the lens group 42d is emitted to the fluorescent wheel 42e. The fluorescent wheel 42e is composed of a green fluorescent body to emit green light by being excited by the excitation laser beam, and converts the excitation laser beam into green light. The fluorescent wheel 42e, which is connected to the spindle motor 42f, is rotated by the spindle motor 42f.

The first light source 41 is a red light-emitting diode to emit red light. The second light source 43 is a blue light-emitting diode to emit blue light. The time-division light generator 40 further includes a driving device 2 for the first light source 41 and a driving device 2 for the second light source 43. The timing of operating period of the controller 12 of the driving device 2 for the first light source 41, that for the excitation light sources 42a and that for the second light source 43 are different from one another. Therefore, red light, green light and blue light are generated on a time division basis (green light is caused by excitation light). When the controller 12 of the driving device 2 for the first light source 41, that for the excitation light sources 42a and that for the second light source 43 operate one time in series in the period of one frame, for example, each of red light, green light and blue light is emitted one time in the period of one frame. At least one of red light, green light and blue light may be emitted multiple times in the period of one frame.

The first light source 41 is disposed such that the optical axis of the first light source 41 lies in parallel with the optical axis of the lens groups 42c, 42d. The second light source 43 is disposed such that the optical axis of the second light source 43 lies at right angles to the optical axis of the lens groups 42c, 42d and the optical axis of the first light source 41.

The optical system 44 causes the optical axis of red light emitted from the first light source 41, the optical axis of green light emitted from the light source unit 42 and the optical axis of blue light emitted from the second light source 43 to coincide with one another; and emits the red light, green light and blue light. The optical system 44 includes a lens group 44a, a lens 44b, a lens group 44c, a first dichroic mirror 44d and a second dichroic mirror 44e.

The lens group 44a faces the second light source 43. The lens group 44a and the lens 44b are disposed such that the optical axis of the lens group 44a is in the same straight line as the optical axis of the lens 44b. The lens group 44a and the lens 44b are disposed such that the optical axis of the lens group 44a and that of the lens 44b lie at right angles to the optical axis of the lens group 42c and the lens group 42d between the lens group 42c and the lens group 42d.

The first dichroic mirror 44d is disposed between the lens group 44a and the lens 44b, and disposed between the lens group 42c and the lens group 42d. The first dichroic mirror 44d intersects with the optical axis of the lens groups 42c and 42d at a 45-degree angle, and intersects with the optical axis of the lens group 44a and the lens 44b at a 45-degree angle. The first dichroic mirror 44d transmits the excitation light in a predetermined wavelength band (blue excitation light, for example), which is emitted from the excitation light sources 42a, toward the fluorescent wheel 42e; and transmits the light in the blue wavelength band, which is emitted from the second light source 43, toward the second dichroic mirror 44e. The first dichroic mirror 44d reflects the light in a green wavelength band, which is emitted from the fluorescent wheel 42e, toward the second dichroic mirror 44e.

The lens group 44c faces the first light source 41. The lens group 44c is disposed such that the optical axis of the lens group 44c lies at right angles to the optical axis of the lens group 44a and the lens 44b on the opposite side of the second light source 43 and the first dichroic mirror 44d with respect to the lens 44b.

The second dichroic mirror 44e is disposed on the opposite side of the first light source 41 with respect to the lens group 44c, and disposed on the opposite side of the first dichroic mirror 44d with respect to the lens 44b. The second dichroic mirror 44e intersects with the optical axis of the lens group 44c at a 45-degree angle, and intersects with the optical axis of the lens group 44a and the lens 44b at a 45-degree angle. The second dichroic mirror 44e transmits the light in the blue and green wavelength bands, which is emitted from the first dichroic mirror 44d, toward the light-source optical system 50; and reflects the light in the red wavelength band, which is emitted from the first light source 41, toward the light-source optical system 50.

The structure of the time-division light generator 40 is not limited to the above-described structure, but any structure may be employed as long as the time-division light generator 40 emits red light, green light and blue light on a time division basis.

For example, a green light-emitting diode may be provided at the place where the fluorescent wheel 42e and the optical axis of the lens group 42d intersect, and the green light-emitting diode may be controlled to flash by the driving device 2 shown in FIG. 1 or FIG. 4. In this case, the excitation light sources 42a, the lens group 42c, the fluorescent wheel 42e and the spindle motor 42f are omitted.

Alternatively, the fluorescent wheel 42e may include a green fluorescent body and a light-diffusing transmission section, and the green fluorescent body and the light-diffusing transmission section may alternately pass the optical axis of the lens group 42d with the rotation of the fluorescent wheel 42e. In this case, each of the excitation light sources 42a is a blue laser diode, and the second light source 43 is omitted. The blue light transmitted through the light-diffusing transmission section of the fluorescent wheel 42e is led to the lens group 44a from the direction similar to the optical system of the second light source 43 using a reflective optics (not shown). This causes the excitation light sources 42a and the first light source 41 to alternately emit light.

The light-source optical system 50 projects the red light, green light and blue light emitted from the time-division light generator 40 onto the display element 30. The light-source optical system 50 includes a lens 51, a reflecting mirror 52, a lens 53, a light-guiding unit 54, a lens 55, an optical-axis converting mirror 56, a light condensing lens group 57, an irradiation mirror 58 and an irradiation lens 59.

The lens 51 is disposed on the opposite side of the lens 44b with respect to the second dichroic mirror 44e. The lens 51 is disposed such that the optical axis of the lens 51 coincides with the optical axis of the lens 44b and the lens group 44a.

The lens 53, the light-guiding unit 54 and the lens 55 are disposed such that their optical axes are in the same straight line. The optical axis of the lens 53, the light-guiding unit 54 and the lens 55 lies at right angles to the optical axis of the lens 51, the lens 44b and the lens group 44a.

The reflecting mirror 52 is provided at the place where the optical axis of the lens 53 and that of the lens 51 intersect. The reflecting mirror 52 intersects with the optical axis of the lens 51, 44b and lens group 44a at a 45-degree angle, and intersects with the optical axis of the lens 53, the light-guiding unit 54 and the lens 55 at a 45-degree angle. The red light, green light and blue light, which are generated by the time-division light generator 40, are condensed by the lens 51 and the lens 53 and reflected by the reflecting mirror 52 toward the light-guiding unit 54.

The light-guiding unit 54 is a light tunnel or a lightrod. The light-guiding unit 54 reflects or totally reflects multiple times the red light, green light and blue light, which are emitted from the time-division light generator 40, on the side surface of the light-guiding unit 54. This allows each of the red light, green light and blue light to be a beam having a uniform intensity distribution. The lens 55 projects the red light, green light and blue light, which are guided by the light-guiding unit 54, toward the optical-axis converting mirror 56 and condenses the light. The optical-axis converting mirror 56 reflects the red light, green light, and blue light, which are projected by the lens 55, toward the light condensing lens group 57. The light condensing lens group 57 projects the red light, green light and blue light, which are reflected by the optical-axis converting mirror 56, toward the irradiation mirror 58 and condenses the light. The irradiation mirror 58 reflects the light, which is projected by the light condensing lens group 57, toward the irradiation lens 59. The irradiation lens 59 projects the light, which is reflected by the irradiation mirror 58, toward the display element 30.

The display element 30, which is a spatial light modulator, forms an image by modulating the red light, green light and blue light emitted by the light-source optical system 50 for each pixel (for each spatial light modulation element). Specifically, the display element 30 is a digital micromirror device (DMD) having a plurality of movable micromirrors which are two-dimensionally arrayed, and the movable micromirrors correspond to the respective spatial light modulation elements as pixels. The display element 30 is driven by a driver. That is, when red light is emitted to the display element 30, the ratio of time (duty cycle) during which the red light is reflected toward the later-described projection optical system 60 is controlled for each movable micromirror by controlling each movable micromirror of the display element 30 (PWM control, for example). Thus, a red image is formed by the display element 30. The same applies to the case where green light or blue light is emitted to the display element 30.

The display element 30 may be a transmissive spatial light modulator (such as a panel having liquid crystal shutter array, i.e., so-called liquid crystal display), instead of a reflective spatial light modulator. In the case where the display element 30 is a transmissive spatial light modulator, the optical design of the light-source optical system 50 is changed such that the optical axis of the red light, green light and blue light emitted by the light-source optical system 50 coincides with the optical axis of the later-described projection optical system 60, and the display element 30 is disposed between the projection optical system 60 and the light-source optical system 50.

The projection optical system 60 faces the display element 30, with the optical axis of the projection optical system 60 extending in the front-back direction to intersect the display element 30 (specifically, the optical axis of the projection optical system 60 lies at right angles to the display element 30). The projection optical system 60 projects forward the light reflected by the display element 30 to project an image formed by the display element 30 onto a screen. The projection optical system 60 includes a movable lens group 61 and a fixed lens group 62 or the like. The projection optical system 60 can change the focal length and can perform focusing by moving the movable lens group 61.

The optical system of the projector shown in FIG. 5 may be applied to a rear-projection display.

The present invention should not be interpreted to be limited to the above-described embodiments and the modification. It should naturally be understood that modifications or improvements may appropriately be made without changing the substantial parts of the present invention.

The scope of the present invention is not limited to the above-described embodiments, but covers the scope of the claims and its equivalents.

The entire disclosure of Japanese Patent Application No. 2012-032864 filed on Feb. 17, 2012 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A driving device comprising:
   a switching regulator that includes: (i) a switching element, (ii) a smoothing circuit including (a) an inductor connected to the switching element and (b) a capacitor, and (iii) a controller that turns the switching element on and off, wherein the switching regulator converts input voltage to output voltage as an output of the smoothing circuit by turning the switching element on and off;
   a timing controller that controls the controller to operate and stop operating; and
   a feedback circuit that feeds back the output voltage,
   wherein the controller performs constant current control in which the controller feeds back current of the inductor, generates a PWM signal based on the fed-back current and a current target value, and outputs the PWM signal to the switching element so that the current of the inductor approximates to the current target value;
   wherein, when performing the constant current control, the controller sets the current target value to a value different from a reference current target value for a steady period;
   wherein a transient period between a start of operation of the controller and the steady period includes a first period which begins at the start of the operation of the controller and in which the output voltage fed back by the feedback circuit increases with time;
   wherein, in the first period, the controller sets the current target value to a value obtained by adding a current correction value $\beta$ to the reference current target value, the current correction value $\beta$ being calculated by $\beta = k \times \alpha \times C$, where k is a predetermined positive constant, $\alpha$ is a time rate of change of the output voltage fed back by the feedback circuit, and C is a capacitance of the capacitor; and
   wherein, in the first period, the controller sets the current target value to a value higher than the reference current target value by an absolute value of the current correction value $\beta$.

2. The driving device according to claim 1, wherein the controller stores a correction table that shows a correspondence between the time rate of change and the current correction value $\beta$, retrieves the current correction value $\beta$ corresponding to the time rate of change of the fed-back output voltage from the correction table, and sets the current target value to a value obtained by adding the retrieved current correction value $\beta$ to the reference current target value.

3. The driving device according to claim 1,
   wherein the transient period further includes a second period which follows the first period and in which the output voltage fed back by the feedback circuit decreases with time; and
   wherein, in the first period, the controller sets the current target value to a value higher than the reference current target value by the absolute value of the current correction value $\beta$, then, in the second period, the controller sets the current target value to a value lower than the reference current target value by the absolute value of the current correction value β, and after that the controller sets the current target value to the reference target value when the controller performs the constant current control.

4. The driving device according to claim 1, wherein a load is driven by the driving device in the operating period during which the PWM signal is enabled, the operating period being determined by the timing controller.

5. A flasher device comprising:
   the driving device according to claim 1; and
   a light-emitting element to which the output voltage is supplied.

* * * * *

UNITED STATES PATENT AND TRADEMARK OFFICE
CERTIFICATE OF CORRECTION

PATENT NO. : 9,342,083 B2
APPLICATION NO. : 13/760346
DATED : May 17, 2016
INVENTOR(S) : Hideo Suzuki Page 1 of 1

It is certified that error appears in the above-identified patent and that said Letters Patent is hereby corrected as shown below:

In the Claims

Column 13, line 4, after "reference" insert --current--.

Signed and Sealed this
Ninth Day of August, 2016

Michelle K. Lee
*Director of the United States Patent and Trademark Office*